(12) United States Patent
Hwang et al.

(10) Patent No.: US 7,896,997 B2
(45) Date of Patent: Mar. 1, 2011

(54) COMPOSITE SHEET USED FOR ARTIFICIAL LEATHER WITH LOW ELONGATION AND EXCELLENT SOFTNESS

(75) Inventors: Young-Nam Hwang, Kyungsangbuk-do (KR); Won-Jun Kim, Kyungsangbuk-do (KR); Jae-Hoon Chung, Kyungsangbuk-do (KR)

(73) Assignee: Kolon Industries Inc., Kwacheon (KR)

( * ) Notice: Subject to any disclaimer, the term of this patent is extended or adjusted under 35 U.S.C. 154(b) by 18 days.

(21) Appl. No.: 11/714,254

(22) Filed: Mar. 6, 2007

(65) Prior Publication Data

US 2007/0151654 A1    Jul. 5, 2007

Related U.S. Application Data

(63) Continuation of application No. 10/501,910, filed as application No. PCT/KR03/00204 on Jan. 29, 2003, now Pat. No. 7,820,569.

(30) Foreign Application Priority Data

Feb. 1, 2002    (KR) .......................... 2002-0005813

(51) Int. Cl.
*D04H 1/48* (2006.01)
*D04H 1/46* (2006.01)

(52) U.S. Cl. .................... 156/148; 156/155; 156/305; 156/325; 156/327

(58) Field of Classification Search ................ 156/148, 156/155, 305, 325, 327
See application file for complete search history.

(56) References Cited

U.S. PATENT DOCUMENTS

| | | | |
|---|---|---|---|
| 3,865,678 A | 2/1975 | Okamoto et al. | |
| 3,979,532 A * | 9/1976 | Muck et al. ................ | 427/245 |
| 4,118,529 A | 10/1978 | Nakagawa et al. | |
| 4,145,468 A | 3/1979 | Mizoguchi et al. | |
| 4,146,663 A | 3/1979 | Ikeda et al. | |
| 4,497,095 A | 2/1985 | Minemura et al. | |
| 5,256,429 A | 10/1993 | Honda et al. | |
| 6,780,469 B2 | 8/2004 | Iijima et al. | |

FOREIGN PATENT DOCUMENTS

| | | |
|---|---|---|
| JP | 62-78281 A | 4/1987 |
| JP | 2000-2000314087 A2 | 11/2000 |
| JP | 2001-2001190307 A2 | 7/2001 |
| KR | 10-140491 B2 | 3/1998 |

* cited by examiner

*Primary Examiner*—Andrew T Piziali
(74) *Attorney, Agent, or Firm*—Birch, Stewart, Kolasch & Birch, LLP

(57) ABSTRACT

A composite sheet used for artificial leather with low elongation and excellent softness which includes a non-woven fabric layer, a woven or knitted fabric layer and a polyurethane resin, wherein the non-woven fabric layer and the woven or knitted fabric layer are entangled with each other.

2 Claims, 2 Drawing Sheets

COMPOSITE SHEET USED FOR ARTIFICIAL LEATHER WITH LOW ELONGATION AND EXCELLENT SOFTNESS

This application is a Continuation of co-pending Application Ser. No. 10/501,910, now U.S. Pat. No. 7,820,569, filed on Jul. 20, 2004 and for which priority is claimed under 35 U.S.C. §120. Application Ser. No. 10/501,910 is the national phase of PCT International Application No. PCT/KR03/00204 filed on Jan. 29, 2003 under 35 U.S.C. §371. The entire contents of each of the above-identified applications are hereby incorporated by reference.

TECHNICAL FIELD

The present invention relates to a composite sheet used for artificial leather with low elongation and excellent softness. More particularly, the present invention relates to a composite sheet used for artificial leather which is useful for the production of artificial leather for furniture, cars, men's clothing and sundry goods because it has an excellent form-stability and a soft touch.

An artificial leather is generally produced by coating resin on the surface of a sheet for artificial leather consisting of two components, i.e., non-woven fabric made of ultra fine fibers and polyurethane resin according to its uses or directly dyeing the surface.

The above-mentioned sheet for artificial leather is produced by a method comprising the steps of: (i) forming a composite fiber capable of becoming fine into a web by a carding-cross lapping process; (ii) needle-punching the web to form a non-woven fabric; (iii) making the fiber ultra fine by impregnating the non-woven fabric with polyurethane resin and extracting and removing the sea component of the composite fiber or by firstly extracting and removing the sea component of the composite fiber and then impregnating the non-woven fabric with polyurethane resin; and (iv) buffing the fabric to form raised fibers on the surface.

BACKGROUND ART

Artificial leather produced by the conventional production method, i.e., suitable for a common artificial leather sheet, is widely used for clothing, shoes, gloves and the like because it has a superior appearance and touch. However, it is inferior in strength and has too high an elongation. This makes it difficult to use the sheet to cover furniture, as a cover sheet for a car chair, for men's clothing and the like which require a form-stability.

To solve such a problem, there was proposed a method for improving form-stability by increasing the amount of polyurethane resin to be impregnated when producing the sheet for artificial leather. In this case, the artificial leather achieves excellent form-stability but is low in softness and accordingly, there is a risk that the appearance of the artificial leather becomes spoiled.

There was an attempt to decrease the amount of polyurethane resin to be impregnated to thus improve the appearance and touch of the product when producing a sheet for artificial leather. In this case, however, the form-stability of the artificial leather became degraded.

Japanese Patent Laid-Open No. S62-78281 and U.S. Pat. No. 5,256,429 disclose a composite sheet for artificial leather which is produced by inserting a layer of fabrics woven from a yarn having more than 1 denier into a non-woven fabric layer of an ultra fine fiber as a reinforcing material, needle-punching them and physically coupling the ultra fine fiber of the non-woven fabric layer and the yarns of the layer of the fabrics.

This method can improve the form-stability of the artificial leather but there is a problem that the fibers of the layer of the fabrics for reinforcement, which has a much large denier than the ultra fine fiber are raised and protrude to the surface of the composite sheet, thus making the touch of the artificial leather rough and hard. Additionally, when performing dyeing, there occurs a difference in dyeing concentration due to a difference in denier between the ultra fine fiber which protrudes to the surface and the thick fiber of the layer of the fabrics for reinforcement, thereby degrading the appearance of the product.

As seen from the conventional art, a composite sheet for artificial leather capable of improving the form-stability and touch of the artificial leather has not yet been developed.

DISCLOSURE OF INVENTION

It is an object of the present invention to provide a composite sheet used for artificial leather which is very useful for the production of artificial leather for furniture, cars, men's clothing and sundry goods because it has excellent form-stability and softness.

The present invention provides a composite sheet for artificial leather which has excellent form-stability and softness so that it is suitable for the production of artificial leather for furniture, cars, men's clothing and sundry goods. Thus, the present invention provides a composite sheet for artificial leather which has excellent elongation and softness which has a stitching strength of more than 30 kg/mm, an elongation at constant load of less than 20% and a stiffness of less than 80 mm by inserting a woven or knitted fabric constructed from a yarn made of ultra fine fibers having a monofilament denier of less than 0.3 into a common sheet for artificial leather composed of a non-woven fabric layer made of ultra fine fiber and polyurethane resin and needle-punching the composite.

To achieve the above object, there is provided a composite sheet for artificial leather according to the present invention, comprising: a non-woven fabric layer (1) made of ultra fine fibers having a fineness less than 0.3 denier; a woven or knitted fabric layer (2) constructed from a yarn made of ultra fine fibers having a fineness less than 0.3 denier; and polyurethane resin, wherein the ultra fine fibers of the non-woven fabric layer (1) and the ultra fine fibers of the woven or knitted fabric layer (2) are entangled with each other.

Additionally, there is provided a composite sheet for artificial leather according to the present invention, comprising: a non-woven fabric layer (1) made of ultra fine fibers; a woven or knitted fabric layer (2) constructed made of ultra fine fibers; and polyurethane resin, wherein the ultra fine fibers of the non-woven fabric layer (1) and the ultra fine fibers of the woven or knitted fabric are entangled with each other and the fineness of the ultra fine fibers of the woven or knitted fabric layer (2) is not more than the fineness of the ultra fine fibers of the non-woven fabric layer (1).

Additionally, there is provided a composite sheet for artificial leather according to the present invention, comprising: a non-woven fabric layer (1) made of ultra fine fibers; a woven or knitted fabric layer (2) made of ultra fine fibers; and polyurethane resin, wherein the ultra fine fibers of the non-woven fabric layer (1) and the ultra fine fibers of the woven or knitted fabric layer (2) are entangled with each other and the composite sheet has a stitching strength of more than 30 kg/mm, an elongation at constant load of less than 20% and a stiffness of less than 80 mm.

Hereinafter, the present invention will now be described in detail.

Firstly, ultra fine fibers which are employable in the present invention are made by conjugate-spinning or mix-spinning two kinds of fiber forming polymer materials into a sea-island type or division type, or by ordinary-spinning of fiber forming polymer materials to a fineness of less than 0.3 denier.

In case of the sea-island type, for the island component, polyester based polymer or nylon based polymer can be used and, for the sea component, copolymer polyester, polyethylene, polyvinyl alcohol, polystyrene and the like which has a solubility in a particular solvent different than that of the island component can be used.

In case of the division type, polyester, nylon and copolymer polyester can be used, which are capable of dividing the ultra fine fibers by extracting or removing one component from two kinds of polymers with a solvent such as sodium hydroxide.

The ultra fine fiber employed in the present invention is formed in two kinds of sheet (layer) form in the composite sheet for artificial leather: one is a staple non-woven fabric layer (1) form and the other is a woven or knitted fabric layer (2) form.

The staple non-woven fabric layer (1) can be made by cutting a yarn (filament) capable of being fine to a fineness less than 0.3 denier into short fibers, then forming a web through a carding-cross lapping process and then needle-punching the same.

The woven or knitted fabric layer (2) can be made by weaving or knitting with a spun yarn, which is made by carrying out a carding-sliving-twisting process on short fibers (staple) prepared by cutting a yarn (filament) capable of being fine to a fineness less than 0.3 denier, or by weaving or knitting with a continuous filament, which is produced by spin-draw process, through a twisting process. That is, the woven or knitted fabric layer (2) constructed of ultra fine fibers used in the present invention can be woven or knitted from a spun yarn made of staple or continuous filament yarn.

The ultra fine fibers used in the present invention preferably have a fineness less than 0.3 denier after a fiber fining treatment. In a case that the fineness of the ultra fine fibers is more than 0.3 denier, it is difficult to obtain artificial leather with a soft touch.

Additionally, the yarn constituting the woven or knitted fabric layer (2) in the present invention is more preferably constructed of ultra fine fibers having a fineness of 0.01 to 0.3 denier. Larger fineness may cause damage of the woven or knitted fabric due to a needle-punching operation for bonding the woven or knitted fabric (2) to the staple non-woven fabric layer (1) and the damaged fibers often come out to the surface of the artificial leather. Thusly, since the fibers of the woven or knitted fabric layer (2) which come to the surface has a larger fineness than that of the staple fibers of the non-woven fabric layer (1), this brings about an uneven appearance of the artificial leather and lower softness. Moreover, since the color of the artificial leather is changed a lot according to the fineness of the fibers after dyeing, the fibers of the woven or knitted fabric layer (2) exposed to the surface appears to be a conspicuous defect. Furthermore, since a large fineness of fibers can make the touch of the woven or knitted fabric layer (2) excessively hard, this can spoil the softness of the artificial leather.

The present invention does not specially limit the lowest value of the denier of the ultra fine fibers constituting the woven or knitted fabric layer (2). However, in the case that the yarn constructed of excessively fine fibers is used for the production of the woven or knitted fabric layer (2), it is difficult to uniformly control the fineness of the ultra fine fibers, the degree of elongation is increased during the process after removing the sea component and the physical properties of the final product, such as strength, elongation and the like, is largely decreased, thereby reducing the effect of improving the form-stability. Therefore, the fineness of the ultra fine fibers is more preferably more than 0.01 denier and less than 0.3 denier.

Additionally, in the present invention, the total denier of the yarn constituting the woven or knitted fabric layer (2) is preferably 30 to 150 denier. Smaller fineness can cause a decrease in physical properties such as strength, elongation and the like, which may bring about a decrease of the form stability. On the other hand, larger fineness can make the woven or knitted fabric layer (2) excessively hard, and thusly it is difficult to obtain a desirable softness and flexibility for artificial leather even if it becomes ultra fine after dissolution.

In the present invention, the yarn constituting the woven or knitted fabric layer (2) is preferably constructed of 200 to 10,000 ultra fine fibers. After a fiber fining treatment, if the number of the ultra fine fibers existing in one strand of the yarn is more than 10,000, the fibers becomes excessively fine or the total denier is increased. This eliminates the effect of improving the form stability or increases the risk of losing the softness of the artificial leather, which is not preferable.

In contrast, if the number of the fibers existing in one strand of the yarn is less than 200 after the fiber fining treatment, the fibers becomes excessively thick or the total denier is decreased. This eliminates the softness or increase the risk of reducing the physical properties such as strength, elongation and the like, which is not preferable.

Moreover, in the present invention, the yarn constituting the woven or knitted fabric layer (2) is preferably a twisted yarn having a number of twists of 500 to 4000 twist/meter (hereinafter, shown as t/m). If the number of twits is 500 to 700 t/m, the form-stability is at an average level but the softness is very excellent. So such a yarn is suitable for artificial leather such as clothing or the like which requires a soft touch.

Further, if the number of twists is 700 to 2,500 t/m, the yarn has a low elongation and good softness, it is suitable for covering for furniture which requires form-stability. On the other hand, if the number of twists is high, that is, 2,500 to 4,000 t/m, the yarn is more suitable for artificial leather such as cover sheet for car chairs which require wear resistance and form-stability.

In case that the woven or knitted fabric layer (2) is a woven fabric, the densities of the warp and weft are more than 40 yarns/inch, more preferably, more than 60 yarns/inch. The weight of the knitted fabric is preferably 30 to 200 g/m$^2$.

The composite sheet which comprises the non-woven fabric layer (1) of the ultra fine fibers combined to the woven or knitted fabric layer (2) can be made by various methods. The most common method is a needle-punching method wherein one or more staple non-woven fabric layers and woven or knitted fabric sheets are alternately arranged and are entangled by needle-punching when making a non-woven fabric.

In another method, a woven or knitted fabric sheet of ultra fine fibers can be bonded with a intermediate product having a non-woven fabric of ultra fine fibers filled with polyurethane resin using an adhesive, or a woven or knitted fabric sheet of ultra fine fibers can be boned with the product of which a series of artificial leather treatment such as buffing or dyeing has been finished.

A 3 to 15% concentration water soluble polymer solution of polyvinyl alcohol or carboxylmethyl cellulose is padded and dried on the composite sheet of the non-woven fabric and the woven or knitted fabric so as to have the amount of 5 to 20% by weight with respect to the weight of the fibers. This process is effective for preventing the touch of the final product from being hard with the polyurethane resin being excessively boned with the fibers converted into a bundle of fine fibers in the later process of impregnating polyurethane resin.

Next, a polyurethane wet impregnating treatment is carried out on the composite sheet. The polyurethane elastomer used in this step is easily dissolved in a straight-chained polymer material consisting of macroglycol, diisocyanate and a low molecular weight diol or diamine, or in some crosslinking polymer materials such as dimethylformamide (hereinafter, referred to as "DMF").

The macroglycol used in the present invention may include polyether glycol, polyester glycol, polyether polyester copolymer glycol, polycarbonate glycol and the like. The low molecular weight diols in the present invention may include 4,4'-butandiol, ethylene glycol and the like. It also may use a chain extender of diamine base such as methylene-bis-(4,4'-phenylamine).

An impregnating solution is made by adding a detergent, pigments, functional particles and the like to such a DMF solution of polyurethane elastomer and diluting the resulting solution. The composite sheet is dipped in the impregnating solution, coagulated in an aqueous solution, washed in hot water at 50 to 80° C. for completely removing temporary filled water soluble polymer, and then dried. The content of the polyurethane after drying is preferably 20 to 50% by weight with respect to the weight of the composite sheet.

Continuously, the fibers are converted into a bundle of fine fibers by removing the sea component from the fiber constituting the non-woven fabric layer (1) and the woven or knitted fabric layer (2) with a solvent or aqueous solution of sodium hydroxide which is capable of dissolving the sea-component. The sea component exists in both fibers of the non-woven fabric layer (1) and fibers of the woven or knitted fabric layer (2). If their types of the sea component are different, fiber fining treatment has to be performed to each of them, which makes the treatment complicated.

Therefore, in the present invention, it is more preferable that the fiber fining treatment is simultaneously attained by only one dissolution process by making the fibers of the non-woven fabric layer (1) and the fibers of the woven or knitted fabric layer (2) from the same type of the sea component.

In case that the sea component is a copolymerized polyester, the sea component is decomposed by a continuous or discontinuous arrangement method with a 5 to 15% aqueous solution of sodium hydroxide. In case that the sea component is polyethylene or polystyrene, the sea component is removed by treating with toluene, perchloroethylene or trichloroethylene.

For example, the copolymerized polyester of the sea component is completely decomposed and removed by treating with a 10% aqueous solution of sodium hydroxide at 100° C. for 5 to 10 minutes. At this time, although the fineness of the composite sheet constructed of the non-woven fabric layer (1) and the woven or knitted fabric layer (2) is decreased to some degree because their sea component is simultaneously removed, the form of the composite sheet is kept well by the structure of the woven or knitted fabric, the degree of longitudinal elongation caused by a mechanical tensile force is not large and the apparent density of the surface of the composite sheet is improved.

As seen from the above method, in general, the sea component is dissolved after impregnating with polyurethane. This is referred to as post dissolution. On the contrary, the sea component can be dissolved before impregnating with polyurethane. This is referred to as pre-dissolution. This method is applied for the purpose of improving the appearance and physical properties of the artificial leather after the fiber fining treatment.

Next, the surface of the thusly obtained composite sheet of the leather form is buffed by a buffing machine equipped with a sand paper of a proper roughness to thus form raised fibers on the surface and then fluffs are shagged. The roughness of the sand paper is differently selected according to its use. Typically, it is preferable to use the sand paper of 150 to 400 meshes.

The composite sheet for artificial leather with fluffs has the following characteristics from a macrostructual viewpoint. Firstly, on the surface formed with the fluffs, there are a small number of filament fibers or spun fibers of the woven or knitted fabric layer (2) broken during needle-punching and protruded to the surface. Even if there are some fibers of the woven or knitted fabric layer (2) protruded to the surface, the fineness is not more than that of the fibers of the non-woven fabric layer (1).

In case that the fibers of the woven or knitted fabric layer (2) protruded to the surface have a larger fineness than a monofilament of the non-woven fabric layer (1), this becomes more apparent after dyeing and their modulus also becomes larger, thereby greatly degrading the appearance and touch of the surface.

Additionally, in the composite sheet for artificial leather of the present invention, the weight ratio of the non-woven fabric layer (1) to the woven or knitted fabric layer (2) is 90:10 to 50:50. Thus, it is preferable that the weight of the non-woven fabric layer (1) is not less than that of the woven or knitted fabric layer (2).

Moreover, in the composite sheet for artificial leather of the present invention, the weight ratio of the ultra fine fibers/polyurethane resin is 90:10 to 50:50. Thus, it is preferable that the amount of the ultra fine fibers constituting the non-woven fabric layer (1) and the woven or knitted fabric layer (2) is not less than that of the polyurethane resin.

The composite sheet for artificial leather having the above-mentioned structural characteristics is finally treated according to its use. Generally, the composite sheet is made into an artificial leather of suede type by a dyeing treatment, or is made into an artificial leather of mirror-like type by forming a polyurethane coating layer on the surface.

In case that the composite sheet for artificial leather of the present invention is the suede type, the ultra fine fibers located on the surface has a raised structure.

When directly performing dyeing, in case that the used fiber comprises nylon-6, it is typically dyed with a metal complex dye or milling type acid dye. In case of polyester, it is dyed with a disperse dye in a high pressure rapid dyeing machine. Finally, when a softening and functional agent treatment is carried out on the dyed product, a composite suede-like artificial leather with excellent surface effect, superior form-stability and softness is made.

In contrast, in case of making an artificial leather of mirror-like type with soft surface, no dyeing is performed on the basic fabric with raised fibers, but polyurethane coating is performed on raised fibers using a typical coating machine for artificial leather. The polyurethane elastomer used in the above coating process is polyurethane for artificial leather having 20 to 30% solid matter. The coating method includes dry or wet coating treatment, if required, laminating treatment.

By the above-mentioned procedure and method, it is possible to make a composite sheet for artificial leather with superior form-stability and soft touch, i.e., low elongation and excellent softness, and an artificial leather using the same.

As described above, in order to make the composite fiber for artificial leather of the present invention, generally, the woven or knitted fabric sheet made of ultra fine fibers is combined to a non-woven web when making the non-woven fabric. Besides, as shown in the above procedure, it is also possible to bind the woven or knitted fabric sheet made of the ultra fine fibers to the product of which a series of artificial leather treatment including dyeing or mirror-like coating treatment has been finished.

In the present invention, various physical properties of the composite sheet for artificial leather are determined as follows.

Fineness (Denier) of Ultra Fine Fiber

The sample of a cross-section of the composite sheet for artificial leather is taken and a preparation process such as gold coating is applied thereto. The photograph of the surface of the composite sheet for artificial leather is taken by a scanning electron microscope. Then, the cross-sectional area of the ultra fine fibers shown on the photograph is evaluated. The cross-sectional area is obtained for each of ten strands (n=10) of the ultra fine fibers and the average value thereof is obtained. The obtained value is converted into an actual value in consideration of the magnification of the photograph. Then, the fineness is obtained through the following formula.

Fineness (Denier)=$9A\rho/1000$

In this formula, A is the surface area ($\mu m^2$) of the cross-section of the ultra fine fiber and $\rho$ is the density ($g/cm^3$) of the ultra fine fiber. The applied density of nylon is 1.14 and the applied density of polyethylene terephthalate is 1.38.

Here, in case that the cross-section is a circular type, the cross-sectional area A of the ultra fine fiber is obtained by the following formula by measuring the diameter of the cross-section. In case that the cross section is non-circular type, the cross-section is directly obtained through an image analyzer and the like.

In case that the cross-section is a circular type:

Cross-section ($\mu m^2$)=$\pi D^2/4$

Number of Ultra Fine Fibers

One strand of yarn constituting the woven or knitted fabric layer (2) is taken from the prepared composite sheet for artificial leather and a preparation process such as gold coating is applied thereto. Then, the photograph of the cross-section of one strand of yarn constituting the woven or knitted fabric layer (2) is taken by a scanning electron microscope and the number of ultra fine fibers shown on the photograph is counted.

Stitching Strength

Two test pieces each having a width of 100 mm and a length of 100 mm are prepared, respectively, in the longitudinal and transverse directions of the composite sheet for artificial leather. One end of a test piece, is overlaid on the one end of another test piece. And then sewing (*) a folded part, which is 10 mm from the ends of each test piece so as to form two groups of test pieces, respectively, in the longitudinal and transverse directions. The stitching strength is measured under the conditions of a clamp distance of 76.2 mm (3 inches), a clamp size of a 20 mm length and a 30 mm width for both upper and lower portions and a pulling speed of 200 mm/min. The measurements in the two directions are averaged and reported herein as the "stitching strength" of the composite sheet in kg of overhang per mm of composite sheet fineness.

* A high tenacity nylon yarn is used as the sewing yarn and the sewing distance is 4 mm. Among common sewing yarns, the high tenacity nylon yarn has a high strength of about 200 denier. It must have a larger tension strength than those of the test pieces and must not change the test result. In addition, the stitches at the opposite ends have to be tightly knotted by sewing it with a sewing yarn that is cut to a slightly large length, so that it cannot be loosened.

Elongation at Constant Load

Three test pieces each having a width of 50 mm and a length of 250 mm are cut out from the composite sheet for artificial leather in the longitudinal and transverse directions and a standard length of 100 mm is marked along their center lines. These test pieces are mounted on a fatigue tester (*) at a clamp distance of 150 mm and a 8 kg load (including the load of the lower clamp) is carefully suspended on the test pieces for 10 minutes. With the load being suspended for 10 minutes, the standard length ($l_0$) is obtained and the elongation at constant load is calculated by the following formula;

Elongation at constant load (%)=$l_0-100$

In this formula, $l_0$ designates the standard length (mm) after suspending the load of 8 kg for ten minutes. * As the fatigue tester, 'Marlens fatigue tester' is used.

Stiffness

Five test pieces, each having a 25 mm width and a 200 mm length, are taken out of a sample, respectively, in the longitudinal and transverse directions. The test pieces are placed on a smooth horizontal table having a 45 degree inclined surface at its pointed end and a scale at its top surface so that the shorter side of the test pieces matches the base line of the scale. Then, the test pieces are pressed by a pressing plate of the same size as the test pieces and are slid toward the inclined surface at a speed of approximately 10 mm/sec, and when the one end of the test pieces contacts the inclined surface, the position of the other end of the test pieces is read by the scale. The stiffness is indicated by the moving distance (mm) of the test pieces from the base line. The stiffness is measured both for the front surface and for the backside of each test pieces, and expressed in an average obtained from the measurements made for the front surface and backside of five test pieces, respectively, in the longitudinal and transverse directions.

Surface State (Appearance/Color Difference)

The surface state is evaluated by 10 panelists. The surface state judged by more than 8 persons to be good was designated as "⊙"; the case where six or seven persons judged the surface state to be good was designated as "◇"; the case where four or five persons judged the surface state to be good was designated as "Δ"; and the case where three or less persons judged the fabric to be good was designated as "x".

BRIEF DESCRIPTION OF THE DRAWINGS

These and other features, aspects, and advantages of preferred embodiments of the present invention will be more fully described in the following detailed description, taken accompanying drawings. In the drawings.

Figure 1:
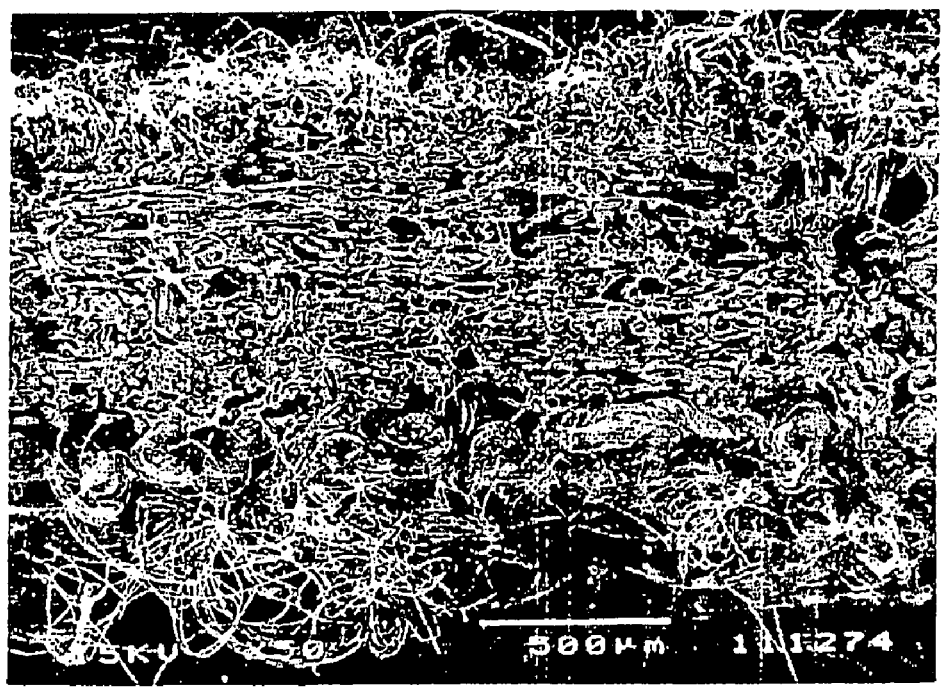
FIG. 1 is a scanning electron micrograph of a cross-section of a composite sheet for artificial leather of the present invention.
Figure 2:
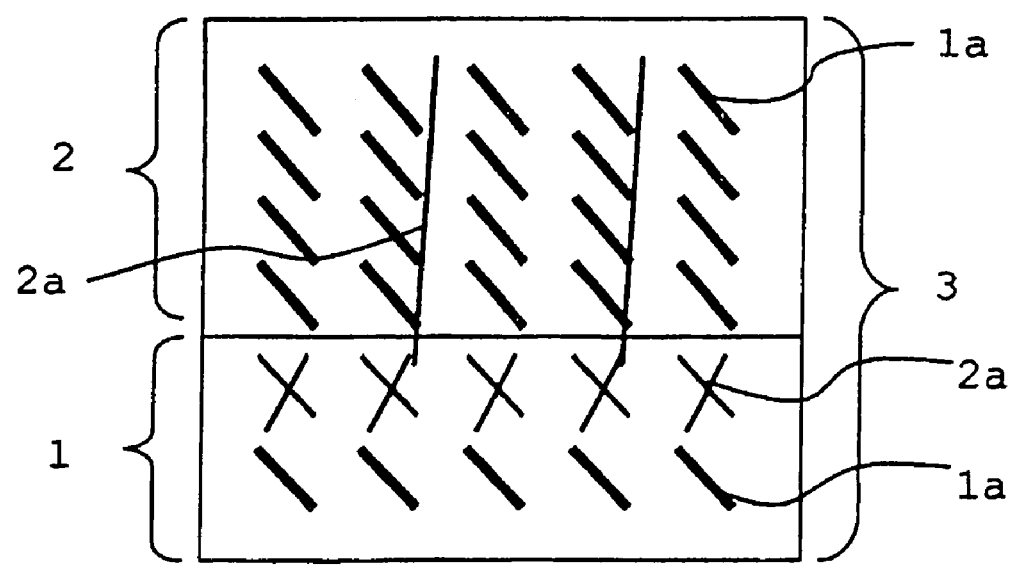
FIG. 2 is a schematic view of the cross-section of the composite sheet for artificial leather of the present invention wherein the denier of ultra fine fibers of a woven or knitted fabric layer (2) is smaller than that of ultra fine fibers of a non-woven fabric layer (1)
Figure 3:
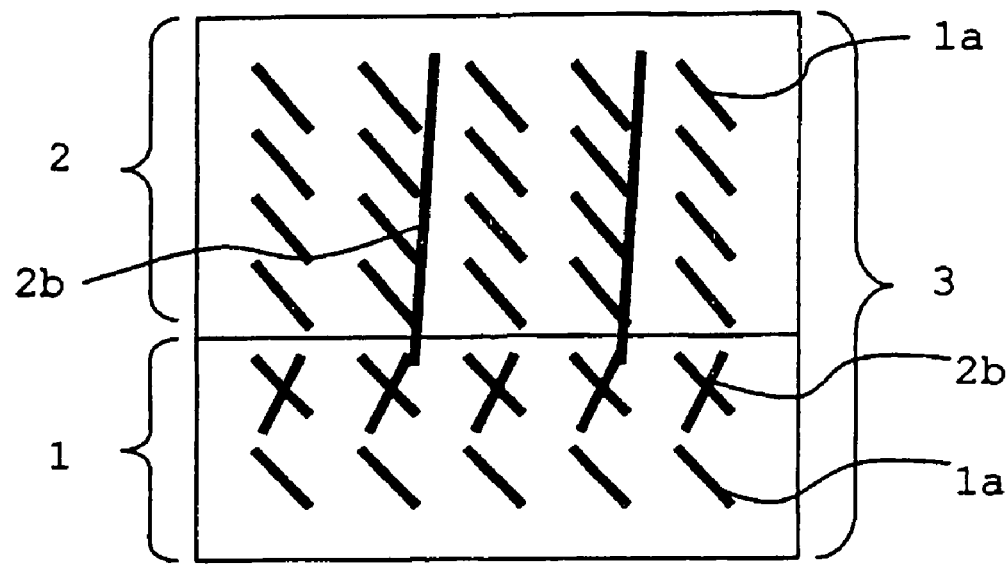
FIG. 3 is a schematic view of the cross-section of the composite sheet for artificial leather of the present invention wherein the denier of the ultra fine fibers of the woven or knitted fabric layer (2) is the same as that of the ultra fine fibers of the non-woven fabric layer (1)
Figure 4:
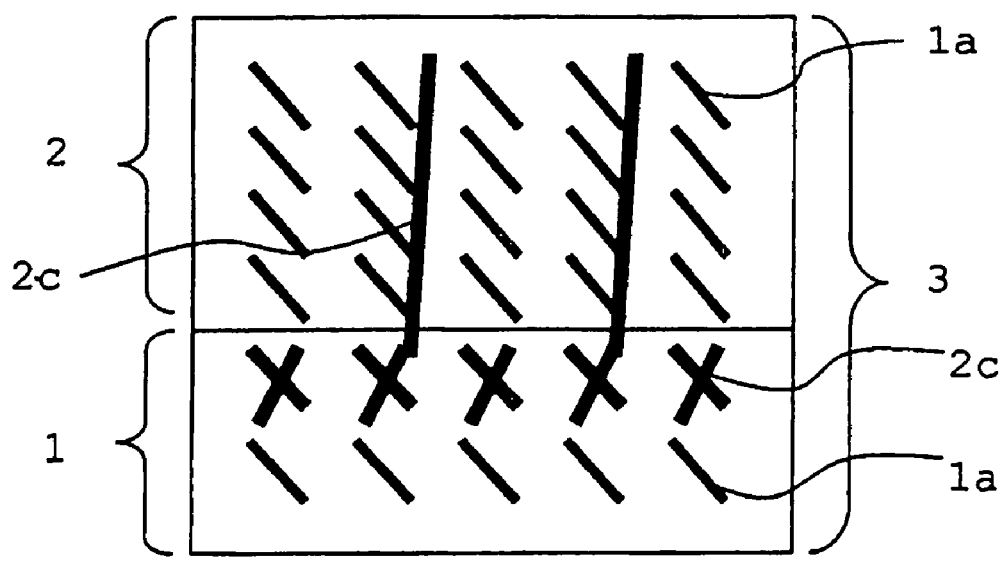
FIG. 4 is a schematic view of the cross-section of the composite sheet for artificial leather of the present invention wherein the denier of the ultra fine fibers of the woven or knitted fabric layer (2) is larger than that of the ultra fine fibers of the non-woven fabric layer (1).

※ Explanation of reference numerals for main parts of the drawings

1: non-woven fabric layer made of ultra fine fibers
1a: ultra fine fibers of non-woven fabric layer
2: woven or knitted fabric made of ultra fine fibers
2a: ultra fine fibers of woven or knitted fabric having a smaller denier than ultra fine fibers of non-woven fabric layer
2b: ultra fine fibers of woven or knitted fabric having the same denier as ultra fine fibers of non-woven fabric layer
2c: ultra fine fibers of woven or knitted fabric having a larger denier than ultra fine fibers of non-woven fabric layer
3: area having a combination of ultra fine fibers and polyurethane resin

BEST MODES FOR CARRYING OUT THE INVENTION

Hereinafter, the present invention will be described in detail with reference to examples, but not limited thereto.

Example 1

A sea-island type composite continuous fiber having a fineness of 3 deniers convertible into a bundle of fine fibers was prepared from 70 by parts weight of polyethylene terephthalate as a fiber-forming component and 30 parts by weight of copolymer polyester as an extraction component through spinning and drawing processes. At this time, the monofilament of the continuous fiber has 16 ultra fine fibers (fiber-forming component) therein. A part of the thusly obtained composite fiber convertible into a bundle of fine fibers was used to produce short fibers by cutting it out at a 40 mm length and giving a crimp. Another part thereof was used as warp and weft in producing a woven fabric which had a warp density of a 100 yarns/inch, a weft density of 80 yarns/inch and a weight of 100 g/yd after twisting it in the form of continuous fibers with a total fineness of 75 deniers at 2500 twists per meter in a twisting machine. The above-mentioned short fibers formed a web by a carding-cross lapping process, and this web was combined to the woven fabric by needle-punching during the preparation of a non-woven fabric, thereby forming a composite sheet. Then, the composite sheet of the now-woven fabric layer and the woven fabric layer was padded and dried in a 10% aqueous solution of polyvinyl alcohol so as to have the amount of 10% by weight with respect to the weight of the fibers. Afterwards, the composite sheet was dipped in a 15% impregnating solution prepared by diluting a polyurethane elastomer of the polyether-polyester copolymer glycol type in dimethylformamide (DMF). Then, the polyurethane was coagulated in the aqueous solution, washed in a 70° C. hydrothermal solution for removing polyvinyl alcohol polymer, and dried. The content of polyurethane after the drying step was found to be 25% by weight. The composite sheet constructed of the above-mentioned fibers and polyurethane was converted into a bundle of fine fibers by continuously treating it in a 10% aqueous solution of sodium hydroxide at 100° C. for completely removing the sea component, i.e., copolymer polyester, so that only the island component, i.e., the component of polyester fine fibers, was left. At this time, both the fibers in the non-woven fabric layer and the ultra fine fibers in the woven fabric layer had a fineness of 0.13 denier and the number of ultra fine fibers constituting the filament of woven fabric was 400. Then, a part of the ultra fine fibers was cut out and raised by carrying out buffing treatment using a #240 grit sand paper in order to obtain fluffs. Next, the obtained sheet was dyed with a disperse dye having an excellent fastness in a high pressure rapid dyeing machine. Then the sheet was reduction, cleared, and dried. Continuously, water repellent and antistatic agent treatment and fluff tip softening treatment were carried to thus prepare a suede-like composite sheet for artificial leather. The physical properties of the thus obtained composite sheet for artificial leather were evaluated and the result was shown in Table 2.

Examples 2 to 5

Except that the denier of ultra fine fibers of a non-woven fabric, the number of ultra fine fibers of a yarn constituting a woven fabric, the number of twists of the yarn constituting the woven fabric, and the denier of ultra fine fibers of the yarn constituting the woven fabric are changed as in Table 1, a composite sheet for artificial leather was prepared in the same manner as that in EXAMPLE 1. The physical properties were evaluated and shown in Table 2.

TABLE 1

Preparation Conditions

| | Denier of ultra fine fibers in non-woven fabric (denier) | Filament of woven fabric | | |
|---|---|---|---|---|
| | | Denier of ultra fine fibers | Number of ultra fine fibers | Number of twists |
| Example 1 | 0.13 | 0.13 | 400 | 2,500 |
| Example 2 | 0.15 | 0.07 | 900 | 2,000 |
| Example 3 | 0.07 | 0.07 | 3,600 | 1,000 |
| Example 4 | 0.07 | 0.04 | 900 | 600 |
| Example 5 | 0.20 | 0.13 | 1,500 | 3,000 |

Comparative Example 1

Except that a polyester multifilament of 75 deniers/24 filaments (monofilament denier: 3.16 denier) was used as the warp and weft of a woven fabric, a composite sheet for artificial leather was prepared in the same manner as that in Example 1. The physical properties were evaluated and shown in Table 2.

Comparative Example 2

Except that a polyamide multifilament of 75 deniers/24 filaments (monofilament denier: 3.16 denier) was used as the warp and weft of a woven fabric, a composite sheet for artificial leather was prepared in the same manner as that in Example 1. The physical properties were evaluated and shown in

TABLE 2

Result of Evaluation of Physical Properties

| | Stitching Strength (kg/m) | Elongation at Constant Load (%) | Stiffness (mm) | Surface State (Appearance, Color Difference) |
|---|---|---|---|---|
| Example 1 | 65 | 3.5 | 49 | ◎ |
| Example 2 | 62 | 4.8 | 42 | ◇ |
| Example 3 | 61 | 7 | 38 | ◎ |
| Example 4 | 48 | 12 | 27 | ◇ |
| Example 5 | 45 | 2.7 | 58 | ◇ |
| Comparative Example 1 | 59 | 5 | 86 | X |
| Comparative Example 2 | 25 | 22 | 73 | Δ |

INDUSTRIAL APPLICABILITY

As the composite sheet for artificial leather of the present invention include a woven or knitted fabric layer (2) composed of a yarn of ultra fine fibers having a fineness less than 0.3 denier and the ultra fine fibers of woven or knitted fabric layer (2) being entangled with the ultra fine fibers of a non-woven fabric layer (1), it is low in elongation and superior in form-stability.

Regarding the form-stability, the composite sheet for artificial leather of the present invention has an elongation at constant load of less than 20% and thus a form change is not occurred much. Additionally, the stitching strength is more than 30 kg/mm and thus shows very strong and wear resistant stitching characteristics. Therefore, the composite sheet for artificial leather of the present invention is very suitable for the production of cover sheet of a car chair and covering for furniture which require superior form-stability and stitching characteristics, and artificial leather for men's clothing which require relatively strong and highly wear resistant.

Moreover, both the fibers of the non-woven fabric layer (1) constituting the composite sheet for artificial leather of the present invention and the fibers of the woven or knitted fabric layer (2) are composed of ultra fine fibers of less than 0.3 denier, and thus are superior in softness. Regarding softness, the composite sheet for artificial leather of the present invention has a stiffness of less than 80 mm and thus is very soft.

Therefore, since the composite sheet for artificial leather of the present invention is excellent in both form-stability and softness, it is very useful for all kinds of leather including natural leather, artificial leather and synthetic leather as well as for cover sheet of a car chair, covering for furniture and clothing.

The invention claimed is:

1. A method of manufacturing a composite sheet for artificial leather, the method comprising:
   providing a sea-island, non-woven fabric layer consisting of composite short fibers having a sea component and an island component, said composite short fibers having a fineness of less than 0.3 denier;
   extracting the sea component from the island component of the sea-island non-woven composite short fibers;
   providing a sea-island woven or knitted composite filament having a sea component and an island component, said composite filament having a fineness not more than the fineness of the island component of the non-woven composite short fiber after said extracting of the sea component of non-woven composite short fiber;
   needle punching the non-woven composite short fibers with the woven or knitted composite filament to form a manufactured composite sheet and
   impregnating the manufactured composite sheet with a polyurethane solution, coagulating the impregnated composite sheet in an aqueous solution, and extracting sea components existing in the coagulated composite sheet.

2. A method of manufacturing a composite sheet for artificial leather, the method comprising:
   providing a sea-island, non-woven fabric layer consisting of composite short fibers having a sea component and an island component, said composite short fibers having a fineness of less than 0.3 denier;
   extracting the sea component from the island component of the sea-island non-woven composite short fibers;
   providing a sea-island woven or knitted composite filament having a sea component and an island component, said composite filament having a fineness not more than the fineness of the island component of the non-woven composite short fiber after said extracting of the sea component of non-woven composite short fiber;
   needle punching the non-woven composite short fibers with the woven or knitted composite filament to form a manufactured composite sheet; and
   impregnating the manufactured composite sheet with a polyurethane solution, coagulating the impregnated composite sheet in an aqueous solution, and extracting sea components existing in the coagulated composite sheet,
   wherein the weight ratio of the composite short fibers that have a fineness of less than 0.3 denier to the polyethylene is 90:10 to 50:50, and the composite sheet has a stitching strength of greater than 30 kg/mm.

* * * * *